US011348429B2

(12) United States Patent
Gnecco

(10) Patent No.: US 11,348,429 B2
(45) Date of Patent: May 31, 2022

(54) APPARATUS, SYSTEMS, AND METHODS PROVIDING REMOTE ACCESS WARNING

(71) Applicant: Siemens Healthcare Diagnostics Inc., Tarrytown, NY (US)

(72) Inventor: Silvio Gnecco, Bedminster, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 15 days.

(21) Appl. No.: 16/097,451

(22) PCT Filed: Jun. 1, 2017

(86) PCT No.: PCT/US2017/035370
§ 371 (c)(1),
(2) Date: Oct. 29, 2018

(87) PCT Pub. No.: WO2017/213947
PCT Pub. Date: Dec. 14, 2017

(65) Prior Publication Data
US 2019/0147718 A1    May 16, 2019

Related U.S. Application Data

(60) Provisional application No. 62/347,297, filed on Jun. 8, 2016.

(51) Int. Cl.
*G08B 21/02* (2006.01)
*G08B 7/06* (2006.01)
(Continued)

(52) U.S. Cl.
CPC ............ *G08B 21/02* (2013.01); *B25J 9/1676* (2013.01); *F16P 3/14* (2013.01); *G08B 7/06* (2013.01); *G08B 21/22* (2013.01)

(58) Field of Classification Search
CPC . G08B 21/02; G08B 7/06; G08B 21/22; B25J 9/1676; F16P 3/14
(Continued)

(56) References Cited

U.S. PATENT DOCUMENTS

2005/0253703 A1   11/2005  He et al.
2008/0001735 A1*  1/2008  Tran ................... A61B 5/6803
340/539.22
(Continued)

FOREIGN PATENT DOCUMENTS

DE         102009051148         5/2010

OTHER PUBLICATIONS

International Search Report for PCT/US2017/035370 dated Aug. 23, 2017.

*Primary Examiner* — Jack K Wang

(57) ABSTRACT

A remote control warning device enabling communication of warnings and/or communication of information with a remote operation device. The remote control warning device includes a housing, a proximity sensor coupled to the housing configured to sense a presence of a person located within a safety zone, one or more warning devices coupled to the housing and configured to display and/or sound a warning to the person, a user interface coupled to the housing and configured to display information and/or allow input by a local operator, and a communication interface operatively coupleable with a communication network to provide communication with the remote operator. Warnings may be provided to the local operator. Automated processing systems including the remote control warning device and methods of operation are provided, as are other aspects.

21 Claims, 3 Drawing Sheets

(51) Int. Cl.
  *G08B 21/22* (2006.01)
  *B25J 9/16* (2006.01)
  *F16P 3/14* (2006.01)
(58) Field of Classification Search
  USPC .................................................. 340/686.6
  See application file for complete search history.

(56) References Cited

U.S. PATENT DOCUMENTS

| | | |
|---|---|---|
| 2008/0235596 A1 | 9/2008 | Bhogal et al. |
| 2009/0201152 A1* | 8/2009 | Karr ................. G08B 13/14 340/572.1 |
| 2010/0021880 A1 | 1/2010 | Barringer |
| 2010/0045476 A1 | 2/2010 | Lenhardt |
| 2010/0295665 A1* | 11/2010 | Landau .............. G06K 7/10366 340/10.42 |
| 2013/0300566 A1 | 11/2013 | Kumfer et al. |
| 2013/0325244 A1* | 12/2013 | Wang ................... G05D 1/0011 701/26 |
| 2014/0213323 A1 | 7/2014 | Holenarsipur et al. |
| 2014/0330433 A1 | 11/2014 | Ciarelli et al. |
| 2015/0070181 A1 | 3/2015 | Fadell et al. |
| 2015/0145667 A1 | 5/2015 | Al Shalabi |
| 2016/0104046 A1 | 4/2016 | Doettling |
| 2016/0247364 A1* | 8/2016 | Herman ............... G08B 19/005 |
| 2017/0061772 A1* | 3/2017 | Hyde ..................... H04W 4/70 |
| 2017/0301213 A1* | 10/2017 | Davis .................... G06N 7/005 |

\* cited by examiner

APPARATUS, SYSTEMS, AND METHODS PROVIDING REMOTE ACCESS WARNING

RELATED APPLICATION

This application claims priority from U.S. Provisional Patent Application Ser. No. 62/347,297 entitled "APPARATUS, SYSTEMS, AND METHODS PROVIDING REMOTE ACCESS WARNING" filed on Jun. 8, 2016, the disclosure of which is hereby incorporated by reference in its entirety herein.

FIELD

Embodiments of the present disclosure relate to apparatus, systems, and methods for automated processing that provide remote operation capability, and more particularly to apparatus, systems, and methods for testing of biological specimens that include remote operation capability.

BACKGROUND

Automated processing systems may perform a sequence of automated chemical and physical transformations of materials with periodic intervention of a local operator. For example, certain automated processing systems may conduct clinical chemistry or assay testing using one or more reagents to identify an analyte or other constituent in a specimen such as urine, blood serum, blood plasma, interstitial liquid, cerebrospinal liquids, and the like. The automated processing system may be operated by a local operator via an operation device (e.g., computer work station) coupled to the automated processing system, where the local operator is located in close proximity to the automated processing system, and usually in the same room. Optionally, the automated processing system may be operated by a remote operator from a remote operation device (e.g., a remote computer work station) at a location remote (e.g., miles from the location of the automated processing system). Software applications allow the remote operator to take control of the automated processing system with an interface screen that looks substantially identical to those used by the local operator so that the remote operator can carry out at least some of the same operations and commands as can a local operator.

However, in some instances, the remote access to the automated processing system can cause certain problems. Accordingly, improved apparatus, systems, and methods are desired to address these problems that can develop during remote access.

SUMMARY

According to a first aspect, a communication module is provided. The communication module includes a housing, a proximity sensor coupled to the housing and configured to sense a presence of a person located within a safety zone, one or more warning devices coupled to the housing and configured to display or sound a warning to the person, a user interface coupled to the housing and configured to display information and/or allow input by a local operator, and a communication interface operatively coupleable with a communication network to provide communication therewith.

According to yet another aspect, an automated processing system is provided. The automated processing system includes a piece of automated processing equipment configured to perform a sequence of automated chemical and/or physical transformations of materials (e.g., a test on an article such as a bio-fluid specimen), a local operation device operable by a local operator, a remote operation device operable by a remote operator, and a remote control warning device located proximate to the automated processing equipment, and wherein the remote control warning device is configured to allow communication with the remote operation device and generates a warning (e.g., an audible and/or visual warning signal) to the local operator.

According to another aspect, method of remotely operating automated processing equipment is provided. The method includes providing a remote operation device configured to remotely operate the automated processing equipment, providing a local operation device configured to locally operate the automated processing equipment, providing a remote control warning device in a proximity to the automated processing equipment, and communicating between the remote control warning device and the remote operation device, and providing a warning to the local operator.

Still other aspects, features, and advantages of the present disclosure may be readily apparent from the following description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the claims.

BRIEF DESCRIPTION OF THE DRAWINGS

The drawings, described below, are for illustrative purposes only and are not necessarily drawn to scale. The drawings are not intended to limit the scope of the disclosure in any way.

DETAILED DESCRIPTION

Figure 1:
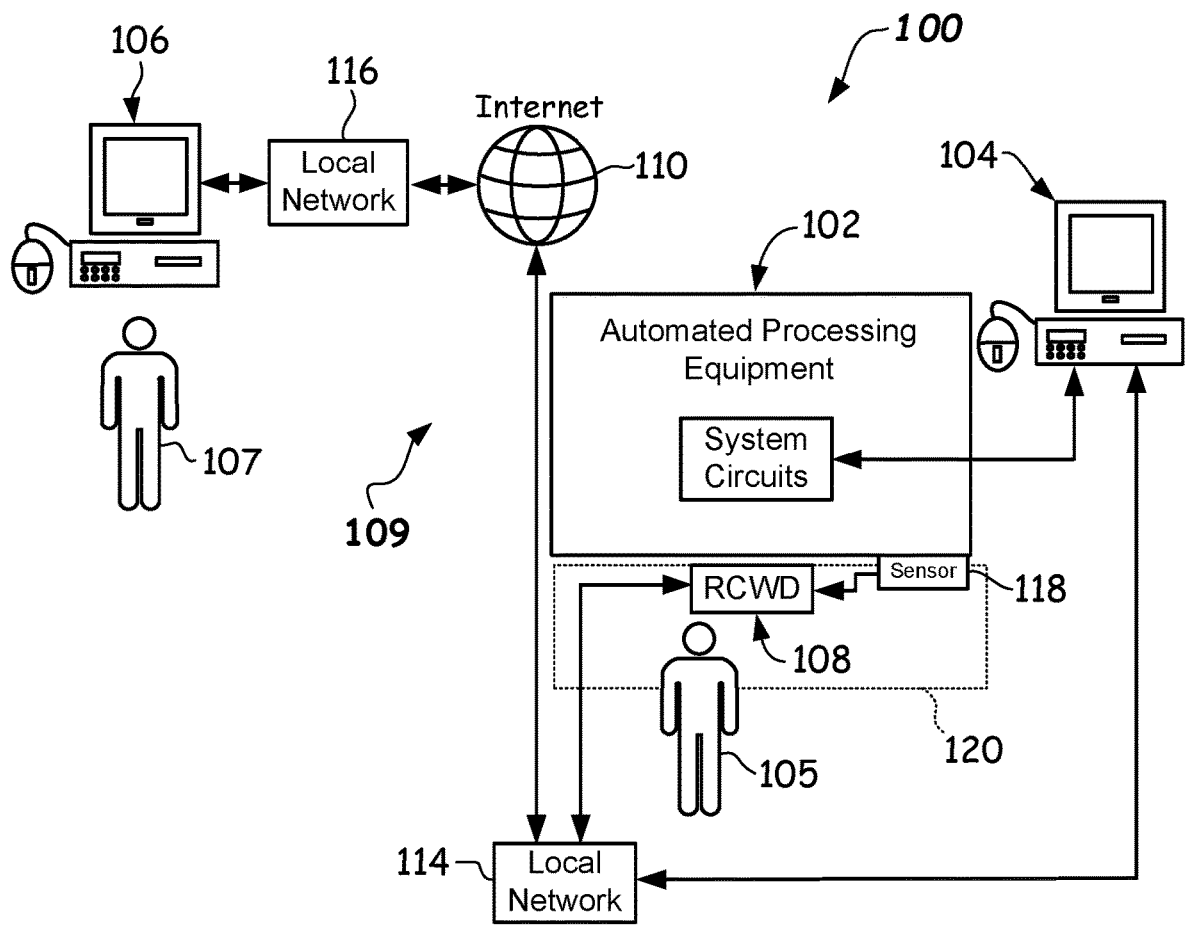
FIG. 1 illustrates a schematic block diagram of an automated processing system including a remote control warning device according to one or more embodiments.

Remote control sessions provide a remote operator physically located far from the automated processing (e.g., automated testing) equipment the convenience of gaining access to a computer program (e.g., software) that manages some or all of the automated processing equipment operations (e.g., testing operations). The remote operator, however, is not aware of the presence of people (e.g., the local operator) that may be at or near the automated processing equipment and possibly manipulating portions of the automated processing equipment for operations such as maintenance, loading, cleaning, equipment manipulation, and the like. Workflow interference or possibly even collisions of moving portions of the automated processing equipment with the local operator may be possible when a remote control session is started by the remote operator without any warning.

In accordance with one or more embodiments, a Remote Control Warning Device (hereinafter "RCWD") is provided. The RCWD is otherwise referred to herein as a "communication module." In one or more embodiments, the RCWD may be a stand-alone device that can be retrofitted to existing automated processing equipment (e.g., automated testing equipment). The RCWD interfaces with the remote operation device, through a communication network. The communication network may include the internet and one or more local area networks (LANs). Other suitable communication networks may be used.

In one or more embodiments, an automated processing system (e.g., an automated biological specimen testing system) including a RCWD is provided, where the RCWD can may be configured and operable to accomplish one or more of the following:

- detect the presence of a person (e.g., the local operator) within a safety zone located proximate to the automated processing equipment,
- receive a status notification generated by the remote operator that a remote control session is about to commence,
- provide an audible (audio) warning and/or visual signal that a remote control session is about to start or is already in progress (i.e., remote control session is active),
- allow the local operator to reject an incoming remote control session,
- allow the local operator to suspend an active remote control session,
- notify the local operator of the identity (name and/or identification number or other indicator) of the remote operator who has started a remote control session,
- as an option, allow the connection of one or more auxiliary sensors that can be installed on or around the automated processing equipment or at locations around the local operator,
- warn the remote operator of certain situations or conditions of, or near, the automated processing equipment, such as a breach of the safety zone, trigger of an auxiliary sensor, or the like,
- communicate that pairing (e.g., communication) is enabled between the RCWD and the remote operation device,
- communicate that RCWD is active and configured and ready to provide warnings,
- provide a network interface that allows notification of the remote operator of monitored events, or
- provide a warning to the remote operator that the RCWD has been relocated; indicating that the association with the specific automated processing equipment is possibly invalid.

Further details of the inventive RCWD, automated processing systems including the RCWD (e.g., automated testing systems), and methods of operating automated processing systems including the RCWD are further described with reference to FIGS. 1-3 herein.

FIG. 1 illustrates an automated processing system 100 including a piece of automated processing equipment 102 configured to perform a sequence of automated chemical and/or physical transformations of materials. For example, the automated processing equipment 102 may perform a test on an article such as a bio-fluid specimen. The bio-fluid specimen may be blood, blood serum or plasma, urine, cerebral fluid, spinal fluid, or other bio-fluid. Other bio-materials may be tested as well. The automated processing equipment 102 may be a chemical analysis apparatus (e.g., a clinical chemistry instrument or analyzer) or a device operable to perform assays in some embodiments. However, the present invention may be applicable to other types of processing operations controlled by a remote operation wherein maintenance or local intervention is involved by a local operator or other person on the controlled process. Examples include metrology and inspection systems, for example.

The automated processing system 100 further includes a local operation device 104 operable by a local operator 105, and a remote operation device 106 operable by a remote operator 107. The automated processing system 100 further includes a remote control warning device (RCWD) 108 (otherwise referred to herein as a "communication module") that may be located proximate to the automated processing equipment 102. The RCWD 108 is typically located between about 0 meters and about 3 meters from the automated processing equipment 102, although other distances are possible. The RCWD 108 may be mounted directly on the automated processing equipment 102 in some embodiments or optionally mounted to another member near the automated processing equipment 102 (e.g., a structure such as a wall, panel, table, post, or the like) so as to be able to sense the local operator 105. The RCWD 108 is configured to allow communication with the remote operation device 106 and is operable to provide a suitable warning to the local operator 105. The RCWD 108 is configured as a stand-alone device, separate in function from the automated processing equipment 102.

The communication between the RCWD 108 and the remote operation device 106 may be established through any suitable type of communication system 109. For example, communication system 109 may include local networks 114, 116 and any suitable type of internet communication system 110, for example. The communication system 109 may include communication through local networks 114, 116, which may interface with a local modem or suitable other internet-engaging devices. In some embodiments, the local operation device 104 and the remote operation device 106 may be operable on a local area network (LAN).

Other suitable types of communication systems 109 may be used to provide communication between RCWD 108 and the remote operation device 106, such as radio communication such as General Packet Radio Service (GPRS), power line communication (PLC), or mobile communication such as 3G or 4G. In some embodiments, the local networks 114, 116 may be Wireless Local Area Network (WLAN), such as Wi-Fi, ZigBee, Windows 7 virtual Wi-Fi, or the like. Optionally, the communication system 109 may be a Wireless Metropolitan Area Network (WMAN) that connects several wireless LANs such as WiMAX. Other suitable communication systems may be used to facilitate communication between the RCWD 108 and the remote operation device 106.

As shown, the RWCD 108 is typically mounted on or very near the automated processing equipment 102. In this way, a dedicated proximity sensor on the RWCD 108 or optionally or additionally one or more auxiliary sensors 118 may survey the area around one or more parts of the automated processing equipment 102 and provide a communication signal to, and notification to, the remote operator 107 through the remote operation device 106. The surveyed area around the automated processing equipment 102 is referred to herein as the safety zone 120 (shown dotted). If the local operator steps into the monitored safety zone 120 then a signal may be sent through the communication system 109 to the remote operator 107 through the remote operation device 106. Also, a suitable warning such as an audible warning and/or light signal may be provided by the RCWD 108, while a remote control session is active. Such warnings may be visual and/or audible and are intended to warn the local operation of certain events.

Figure 2A:
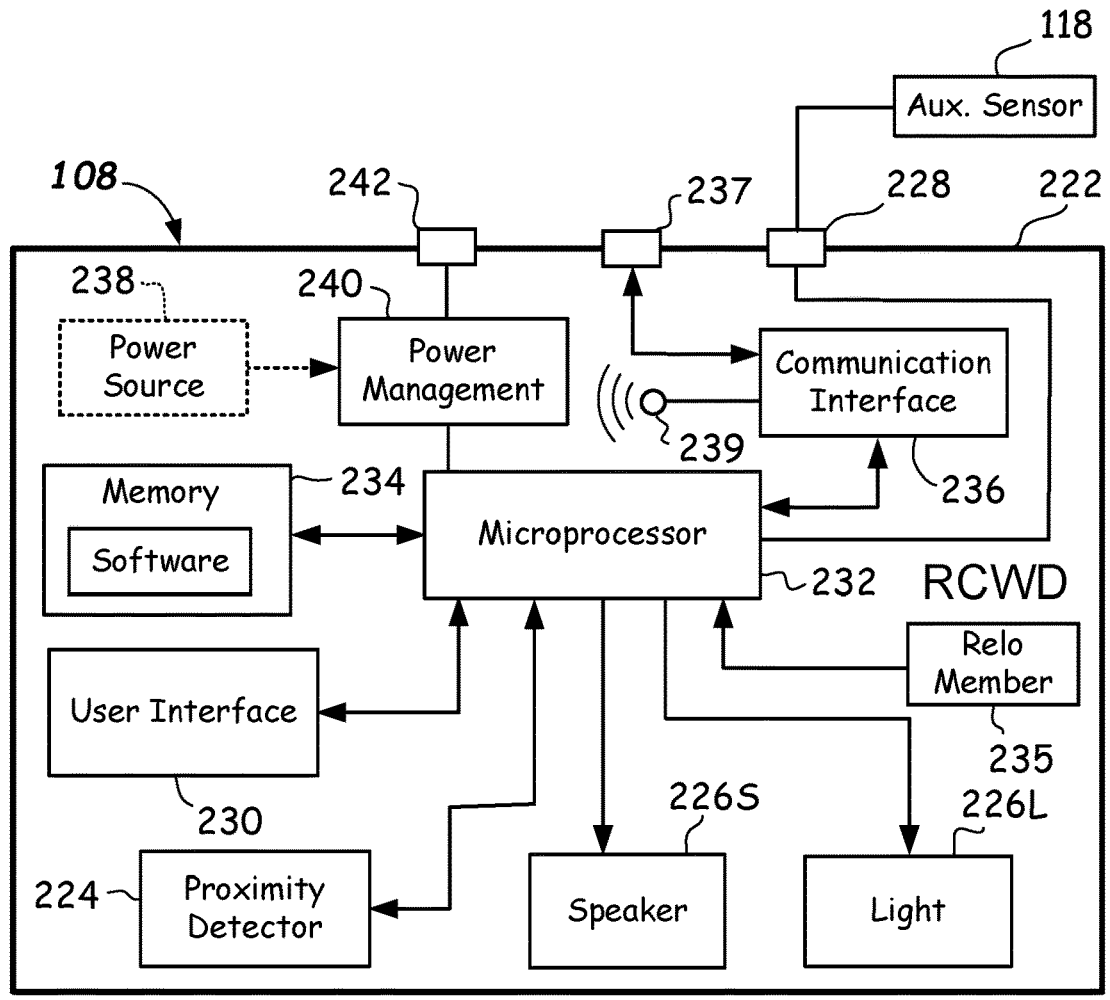
FIG. 2A illustrates a schematic block diagram of a remote control warning device according to one or more embodiments.
Figure 2B:
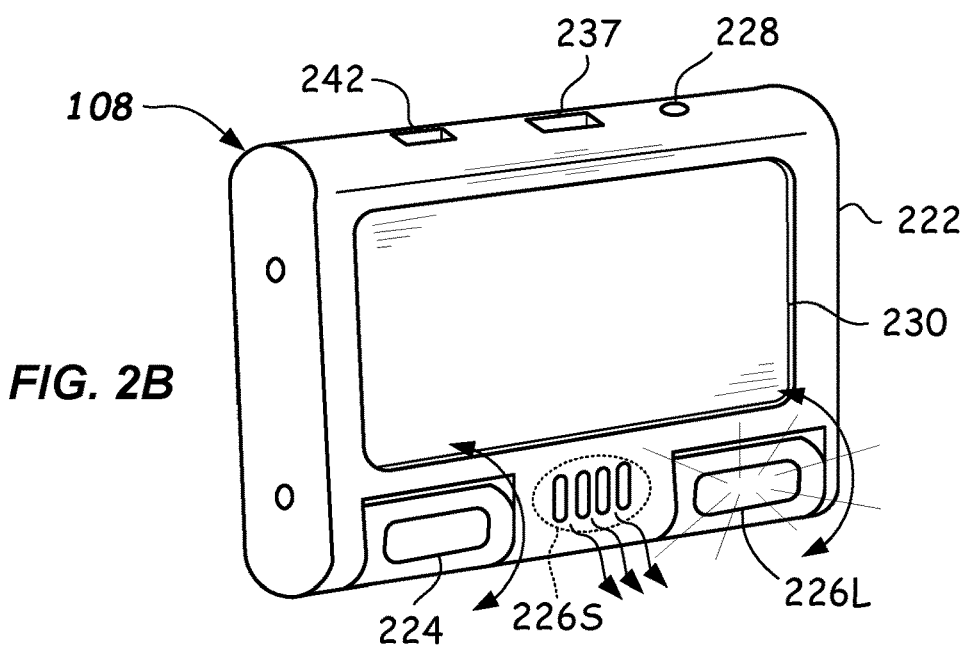
FIG. 2B illustrates an isometric view of a remote control warning device according to one or more embodiments.
Figure 3:
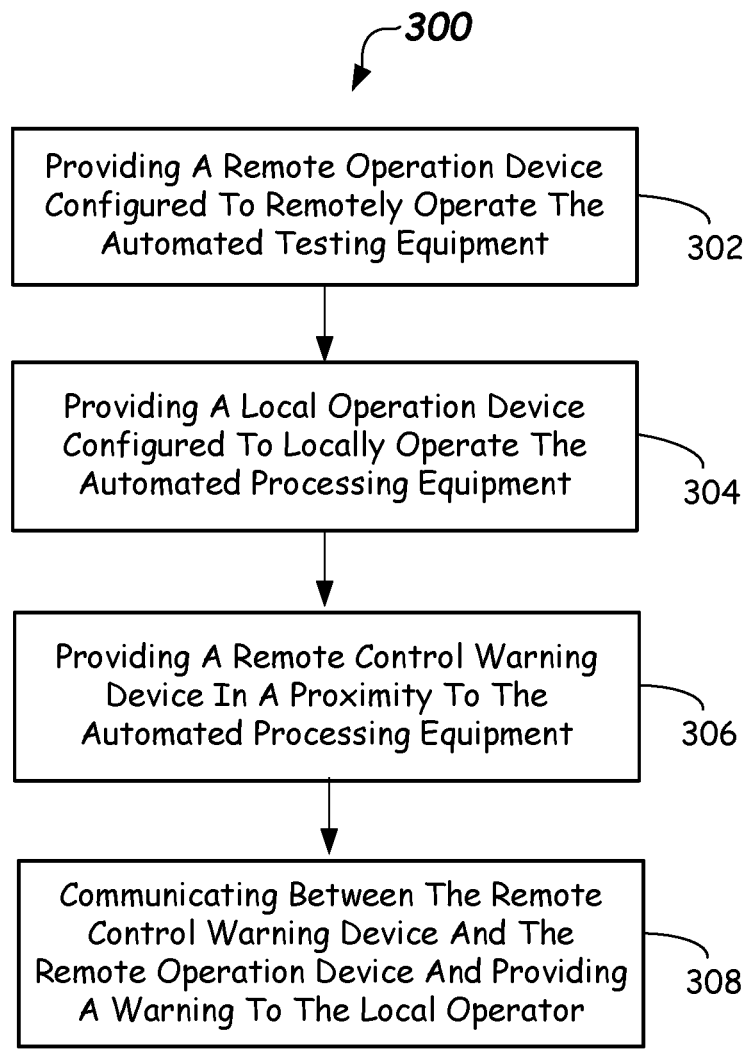
FIG. 3 illustrates a flowchart of a method of operating an automated processing system according to one or more embodiments.

FIGS. 2A and 2B show various views of a communication module (e.g., a RCWD 108 for use with automated processing equipment 102). The RCWD 108 (communication module) may include a housing 222, and a proximity sensor 224 coupled to the housing 222 and configured to sense a presence of a person (e.g., local operator 105) located within a safety zone 120. The safety zone 120 may be a region within about 0-3 meters from the proximity sensor 224, for example. The area surveyed by the proximity sensor 224 may be about 7.5 $m^2$ or more. Other suitable areas and sizes of the safety zone 120 may be used. The housing 222 may be made of a molded plastic or other suitable material (e.g., metal or composite). The housing 222, in one embodiment, may be generally rectangular in shape, and may include dimensions of about 1.5"×4.5"×6.0". Other sizes may be used. The proximity sensor 224 may be any suitable device for sensing the presence of a person, such as an infrared sensor (e.g., a passive infrared sensor) or the like. Other suitable detection sensor and/or detection technologies may be used.

The RCWD 108 (communication module) may include one or more warning devices such as visual warning device 226L and/or audible warning device 226S coupled to the housing 222 and configured to visually display and/or sound a warning to the person (e.g., the local operator 105). The visual warning device 226L may be a light (e.g., a white, red, green, blue, or other colored light) adapted to emit light radiation that can be seen by the local operator 105. The light may be a strobe in some embodiments and may turn on an off in a pattern. Additionally, or optionally, the audible warning device 226S may comprise a speaker adapted to emit audible sound radiation. A piezoelectric alarm buzzer may be used for the audible warning device 226S, for example. In one or more embodiments, both an audible warning device (e.g., audible warning device 226S) and a visual warning device (e.g., visual warning device 226L) may be included. The audible sound radiation may be modulatable, that is, the sound may have one or more distinctive patterns, such as a repeating sound pattern. The sound may be intense, e.g., having a sound pressure level of above 90 dBA, or even above 100 dBA for short periods of time.

Different distinctive warning sound patterns may be used for different warning scenarios. For example, a continuous warning may be audible for when the safety zone 120 is breached. In other embodiments, a rapid sequence warning signal may be provided when the remote control session is about to start. In other scenarios, the warning or notification may be brief, and/or an evenly-spaced, warning signal when a remote control session is in progress. Other scenarios may include a brief repetitive, but a lower intensity signal warning. Different distinctive light patterns and/or colors may be used for different warning scenarios. In one or more embodiments, one or more of the warning devices (e.g., visual warning device 226L) and/or the proximity sensor 224 may be rotatable in orientation relative to the housing 222 (see arrows), such that different mounting scenarios may be accommodated (e.g., vertical wall mount or horizontal table mount), or some angle in between.

As shown in FIGS. 1 and 2A, one or more auxiliary sensors 118 may be coupled to an input port 228 of the RCWD 108. The one of the one or more auxiliary sensors 118 may be mechanically coupled to a protective cover or to a door of the automated processing equipment 102. The auxiliary sensor 118 may be configured to provide a signal to the RCWD 108 and a warning to a remote operator 107 through the remote operation device 106 that the protective cover or door is open. Optionally, one or more auxiliary sensors 118 may be used to expand the safety zone 120 to other locations around the automated processing equipment 102.

Referring to FIGS. 2A-2B, the RCWD 108 may include a user interface 230 coupled to the housing 222. The user interface may be configured to display information and/or allow input by the local operator 105. For example, in the depicted embodiment, the user interface 230 comprises a touch panel display screen, such as an LED or LCD display screen. However other forms of user interface may be used, such as a user keyboard or input buttons. Any suitable type of user interface 230 may be used that interacts with a microprocessor 232. The user interface 230 may comprise screen menus and icons, key shortcuts, command language, as well as physical buttons, knobs, dials, switches, and levers or even a hand-held remote controller enabling the local operator 105 to provide input.

The user interface 230 may be configured to allow a local operator 105 to reject an incoming remote control session or suspend an already active remote control session, such as by selecting an icon from a drop down menu, for example. This may operate to disable the remote operation or simply provide notice to the remote operator 107 via the remote operation device 106. In one or more embodiments, the user interface 230 may be configured to display an identity of a remote operator 107 who is starting an incoming remote control session or is already engaged in an active remote control session.

The RCWD 108 may include any suitable type of memory 234, where the software that defines the operation of the RCWD 108 resides. Memory may be Random Access Memory (RAM) including Ended Data-Out Dynamic Random-Access Memory (EDO DRAM), synchronous dynamic random-access memory (SDRAM), Double Data Rate Synchronous Dynamic Random-access Memory (DDR SDRAM), Single In-line Memory Module (SIMM), Dual In-line Memory Module (DIMM), and/or nonvolatile memory such as Read-Only Memory (ROM) including Programmable Read-Only Memory (PROM), and Electrically Erasable Programmable Read-Only Memory (EEPROM). It is contemplated the memory 234 may be configured to include any combination and form of RAM, ROM, and/or other storage technologies.

The RCWD 108 may include a communication interface 236 that may, in the depicted embodiment, be operatively coupleable with a local network 114 to provide communication therewith and ultimately communication through the internet communication system 110. The communication interface 236 may be a communication chip, electrical circuit, or combination that may allow for a wired communication with the local network 114 via a communication connector 237, such as a RJ45 connector, or other suitable connector. The communication interface 236 is configured to allow the RCWD 108 to exchange information, such as by communication of information packets or strings (e.g., HTTP messages) with the remote operation device 106. Communication may be through the local networks 114, 116. The local networks 114, 116 may include a modem or other suitable communication device for communicating with the internet communication system 110. "Modem" as used herein means any suitable electronic device that is capable of interfacing with the internet communication system 110. Internet communication may be by Transmission Control Protocol/Internet Protocol TCP/IP communication, for example.

In one or more embodiments, the communication interface 236 may be configured to communicate certain monitored events or notifications to the remote operator 107. For example, an "RCWD Idle" notification may be sent, which is a periodic communication between the RCWD 108 and the remote operation device 106 confirming that the communication between the RCWD 108 and the remote operation device 106 is active, connected, and properly configured. In another example, an "Unsafe Remote Control Operation" notification may be sent, which is a communication that a local operator 105 (or other person) is present within the safety zone 120 and/or that the auxiliary sensor 118 has been triggered. In another example, a "Remote Control Access Denied" notification may be sent, which is initiated by the local operator 105 through the user interface 230 (e.g., touch screen) to inform the remote operator 107 that remote session cannot be initiated at this time. In yet another example, a "Local Alert In Progress" may be sent, which is a notification that a remote session is about to commence, and that the RCWD 108 is active and that the warning alarm has been initiated. Then after short period of time, the remote operator 107 may commence the remote session. In another example, a "Remote Control Session Suspension Request," may be initiated, which is a communication from the RCWD 108 to the remote operator 107 that the remote session should be stopped. In a final example, an "RCWD Configuration" notice may be provided, which is an indication displayed on the RCWD 108 and also to the remote operator 107 that communication is active, but that the configuration is not completed to be fully functional. Other types of configuration and/or operability notices may be provided from or between the RCWD 108 and/or remote operation device 106. Optionally, or additionally, the communication interface 236 may be configured to communicate messages (e.g., containing local operator text messages) to the remote operator 107 or receive text messages from the remote operator 107 via the user interface 230.

In some embodiments, the communication interface 236 may be a wireless interface that may be configured to enable wireless communication with the local network 114. The wireless communication may be operable in accordance with any suitable wireless communication protocol such as Wi-Fi or ZigBee. An antenna 239 may be provided for wirelessly communicating with the local network 114 such as to a modem or wireless router (not shown). Other suitable wireless communication systems may be used for communication between the RCWD 108 and the local network 114.

The RCWD 108 may include an input port 228 that may be configured to receive external input from a local device, such as auxiliary sensor 118. Auxiliary sensor 118 may include one or more additional proximity detectors that extend the safety zone 120, input from or a door sensor or protective cover sensor or sensors. In some embodiments, the input may be from the automated processing equipment 102.

Optionally, or additionally, the RCWD 108 may include a detection system that may detect when the RCWD 108 is being moved/relocated from an original mounting location. For example, the RCWD 108 may include a relocation member (relo member) 235, which may be a sensor, switch, or other suitable device that provides a signal when the RCWD 108 is moved from an initial mounting location. For example, the relocation member 235 may be a magnetic switch where a magnet is stationary and provided on the mounting location, and any movement away from the magnet activates the magnetic switch, which then initiates a warning text or other signal to be sent to the remote operation device 106 that the RCWD 108 has been relocated. Other switches or sensors may be used, such as spring loaded mechanical switch, Hall Effect sensor, or the like.

The RCWD 108 may include any suitable power source. Power may be provided from 120V service or optionally from a battery power source 238, such as 12V battery. Other suitable voltage level power sources may be used. A power port 242 may be provided to connect to the service power. Power management circuitry 240 may provide suitable power to operate the various components of the RCWD 108, and the case of battery operation may control charging rate or time to the battery power source 238.

The RCWD 108 may include software for carrying out processing operations, operation of the user interface 230, initiating communication or notices, signal communication either wired or wirelessly, proximity and other sensing, relocation sensing, providing light-based and/or audible warnings, and power management. The software is operational to handle the timing of events, communication (e.g., message and notice delivery) to local operator 105 and remote operator 107, conversion of signals received from proximity sensor 224, auxiliary sensor 118, and/or relocation member 235 into messages for the remote operator 107, and error event determination, and to manage the interface with local operator 105 for message notification and data input and display.

In one or more embodiments, a method 300 of remotely operating automated processing equipment 102 is provided. The method 300 includes, in 302, providing a remote operation device 106 configured to remotely operate the automated processing equipment 102 (e.g., carry out remote testing operations), and, in 304, providing a local operation device 104 configured to locally operate the automated processing equipment 102.

The method 300 further includes, in 306, providing a RCWD 108 in a proximity to the automated processing equipment 102, and, in 308, communicating between the RCWD 108 and the remote operation device 106 and providing a warning to the local operator 105 at certain times. Other communications and notices may be provided between the RCWD 108 and the remote operation device 106, as discussed above.

While the disclosure is susceptible to various modifications and alternative forms, specific system and apparatus embodiments and methods thereof have been shown by way of example in the drawings and are described in detail herein. It should be understood, however, that it is not intended to limit the disclosure to the particular apparatus or methods described but, to the contrary, the intention is to cover all modifications, equivalents, and alternatives falling within the scope of the claims.

What is claimed is:

1. A communication module, comprising:
   a housing;
   a proximity sensor coupled to the housing and configured to sense a presence of a local operator of an automated processing equipment located within a safety zone of the automated processing equipment, the automated processing equipment configured to be controllable by a remote operator and the local operator;

one or more warning devices coupled to the housing and configured to display or sound a warning to the local operator in response to the local operator being within the safety zone; and a communication interface operatively coupleable with a communication network to provide communication between the local operator and the remote operator.

2. The communication module of claim 1, wherein the proximity sensor comprises an infrared detector.

3. The communication module of claim 1, wherein the one or more warning devices comprises a light adapted to emit light radiation.

4. The communication module of claim 1, wherein the one or more warning devices comprises a speaker adapted to emit audible sound radiation.

5. The communication module of claim 4, wherein the audible sound radiation is modulatable.

6. The communication module of claim 1, wherein the one or more warning devices comprises a distinctive warning pattern.

7. The communication module of claim 1, wherein the one or more warning devices are rotatable in orientation relative to the housing.

8. The communication module of claim 1, comprising one or more auxiliary sensors coupled to an input/output port of the communication module.

9. The communication module of claim 8, wherein one of the one or more auxiliary sensors is coupled to a protective cover or a door of a piece of the automated processing equipment and is configured to provide a signal to the communication module and provide a warning to the remote operator that the protective cover or door is open.

10. The communication module of claim 1, comprising a touch panel display screen.

11. The communication module of claim 1, wherein the automated processing equipment is configured to allow the local operator to reject an incoming remote control session or suspend an already active remote control session.

12. The communication module of claim 1, wherein the communication interface is configured to display an identity of a remote operator who is starting an incoming remote control session or is already engaged in an active remote control session.

13. The communication module of claim 1, wherein the communication interface is configured to communicate certain monitored events to the remote operator.

14. The communication module of claim 1, wherein the communication interface is configured to communicate messages between the local operator and the remote operator.

15. The communication module of claim 1, wherein the communication interface is a wireless interface operable in accordance with a communication protocol.

16. The communication module of claim 1, wherein the communication interface is a wired interface adapted to couple to a local area network.

17. The communication module of claim 1, comprising an input port configured to receive external input from one or more auxiliary sensors.

18. The communication module of claim 17, wherein the one or more auxiliary sensors comprises one or more cover sensors configured to provide a signal when a protective cover is open.

19. An automated processing system, comprising:
an automated processing equipment configured to perform automated chemical and/or physical transformations of materials;
a local operation device operable to enable operation of the automated processing equipment by a local operator;
a remote operation device operable to enable operation of the automated processing equipment by a remote operator; and
a remote control warning device located proximate the automated processing equipment, the remote control warning device configured to allow communication between the remote operation device and the local operation device and to provide a warning to the local operator in response to the local operator being within a safety zone of the automated processing equipment.

20. A method of operating automated processing equipment, comprising:
providing a remote operation device configured to remotely operate the automated processing equipment;
providing a local operation device configured to locally operate the automated processing equipment;
providing a remote control warning device in a proximity to the automated processing equipment; and
communicating between the remote control warning device and the remote operation device and providing a warning to a local operator by the remote control warning device in response to the local operator being within a safety zone of the automated processing equipment.

21. The communication module of claim 1, wherein the one or more warning devices are configured to display or sound a warning in response to the local operator being proximate the proximity sensor.

* * * * *